Dec. 15, 1970     H. BOBOWICZ ET AL     3,547,504
DOUBLE-ROW SPHERICAL ROLLER BEARING AND RETAINER
Filed July 22, 1968                    3 Sheets-Sheet 1
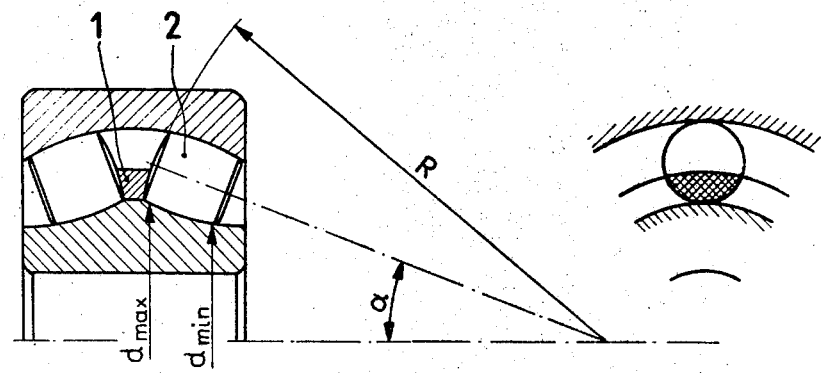
Fig. 1                          Fig. 2
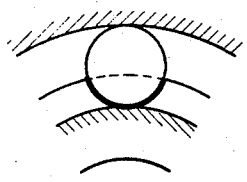  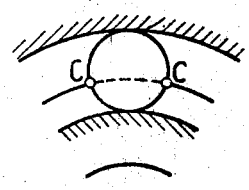  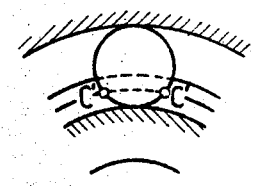
Fig. 3          Fig. 4          Fig. 7
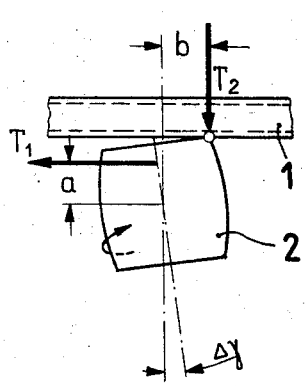  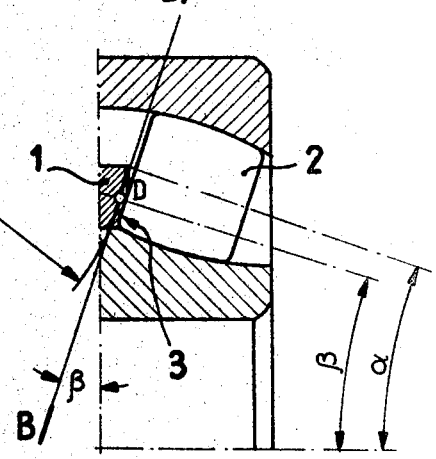
Fig. 5                          Fig. 6
INVENTOR.
BY

United States Patent Office

3,547,504
Patented Dec. 15, 1970

3,547,504
DOUBLE-ROW SPHERICAL ROLLER BEARING AND RETAINER
Henryk Bobowicz, Ul. Walcownicza 48, and Stanislaw Kulma, Ul. Widok 19–198, both of Warsaw, Poland; Lech Cedler, Ul. Zbozowa 11–13, Poznan, Poland, and Piotr Kobylecki, Ul. Powstancow Slaskich 32–1, Warsaw, Poland
Filed July 22, 1968, Ser. No. 746,397
Claims priority, application Poland, July 21, 1967, P 121,814; Aug. 26, 1967, P 122,343
Int. Cl. F16c 22/08
U.S. Cl. 308—194                            3 Claims

ABSTRACT OF THE DISCLOSURE

A double row spherical roller bearing has a floating stabilizing ring between the rows which has convex flanks engaging flat end faces of the roller bearings. A retainer is provided supported from two axially spaced portions of the inner race, and made of a main body portion and a reinforcing ring secured to it.

---

The stabilizing ring in double-row spherical roller bearings, called also a guiding ring, is provided to prevent skewing of the spherical rollers during running, i.e. to stabilize the position of their axes of rotation. Moreover, the stabilizing ring enables the thrust travel of both rows of the spherical rollers when the bearing is additionally loaded with axial forces and thus a uniform load distribution on both rows of the spherical rollers is assured.

Figure 8:
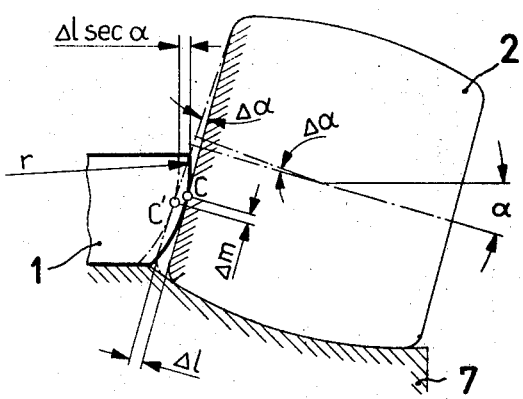
Figure 9:
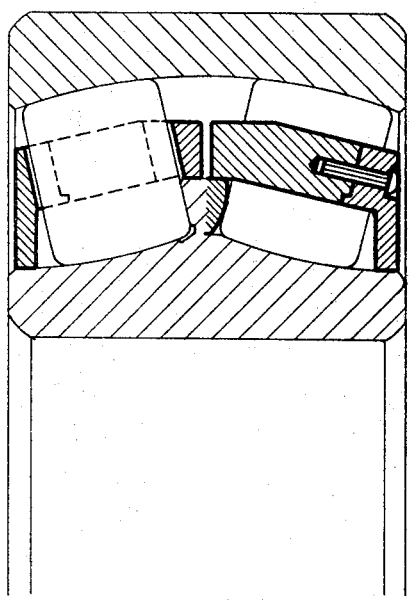
Figure 10:
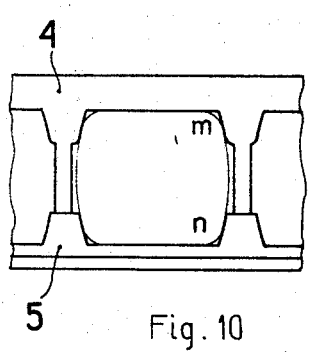
Figure 13:
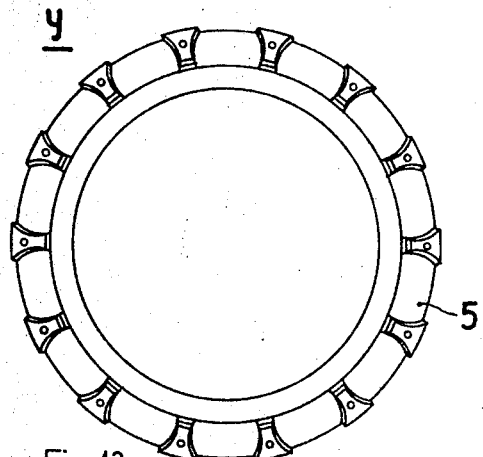
Figure 11:
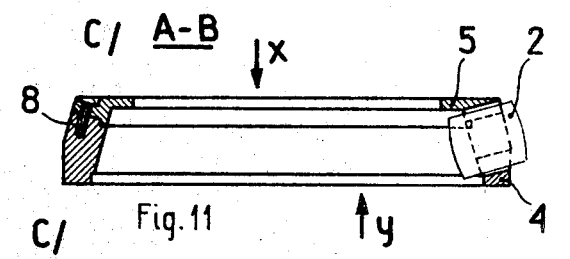
Figure 12:
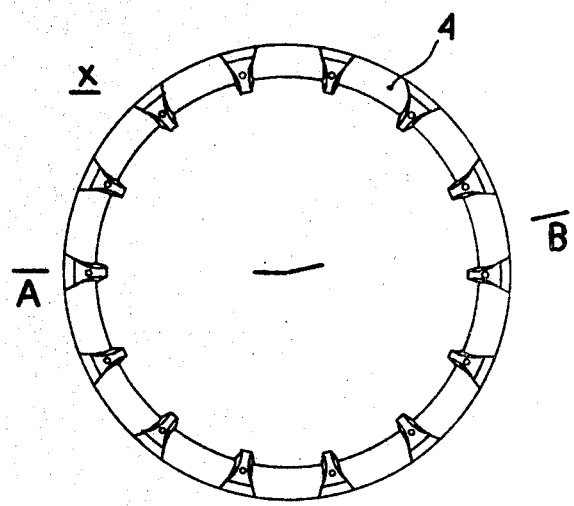
Figures 14, 15:
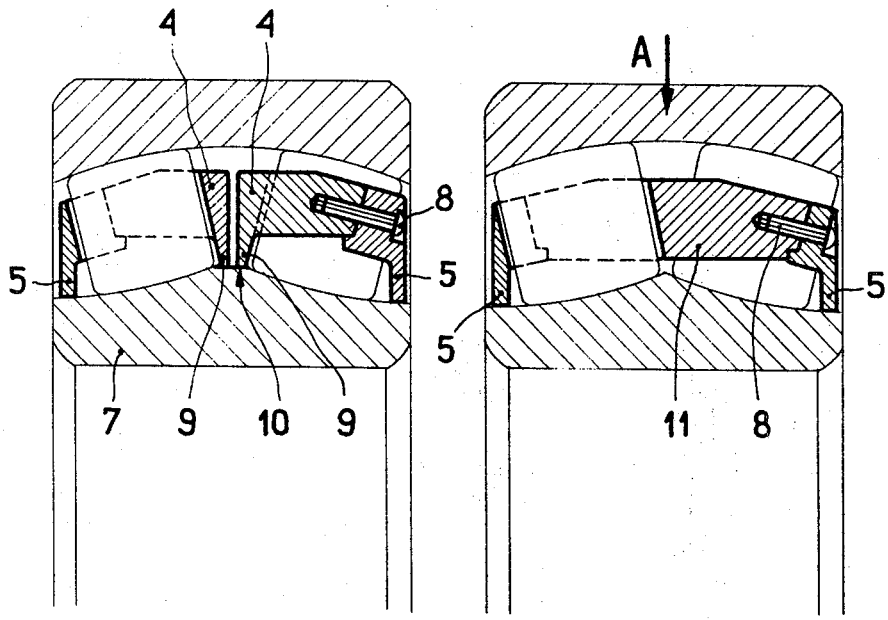
Figure 16:
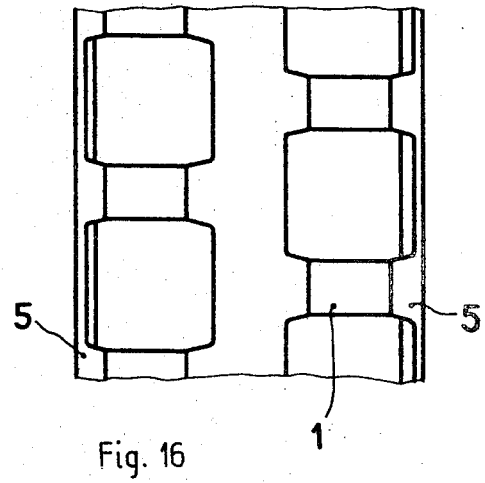

In the drawings:
FIG. 1 is a cross-sectional view of a known bearing.
FIG. 2 is a view illustrating the contact area of a roller with a stabilizing ring.
FIG. 3 illustrates roller contact with a ring having concave flanks.
FIG. 4 illustrates roller contact with a ring having flat flanks.
FIG. 5 is a view showing forces acting on a bearing and ring.
FIG. 6 is a view illustrating the principle of the present invention.
FIG. 7 shows the roller contact with the ring in the present invention bearing.
FIG. 8 is a diagrammatic view of the present invention bearing when loaded.
FIG. 9 is a cross-sectional view showing a bearing in accordance with the invention having a retainer.
FIG. 10 is a detail view of a portion of the retainer of FIG. 9 and a roller.
FIG. 11 is a longitudinal section of the retainer of FIG. 9.
FIG. 12 is an elevational view of one side of the retainer of FIG. 9.
FIG. 13 is an elevational view of the opposite side of the retainer of FIG. 9.
FIG. 14 shows a conventional bearing having another embodiment of the retainer.
FIG. 15 is a sectional view showing a bearing with another embodiment of the retainer.
FIG. 16 is a plane view of the retainer of FIG. 15.

In the known spherical roller bearings with floating stabilizing ring, such as disclosed in Polish Pat. No. 36,636, or in Austrian Pat. No. 173,412, the flanks of this ring, contacting the spherical roller end faces, are concavo-spherical. Such bearings function satisfactorily only when the spherical roller end faces are convexo-spherical, whereby, as shown in FIG. 1, both the flanks of the stabilizing ring 1 and the end faces of the spherical roller 2 are formed with the same radius R, which is centered on the intersection of the spherical rollers rotation axis with the main axis of the bearing as shown in FIG. 1. In such case the contact of the spherical rollers with the stabilizing ring is superficial, as shown by the dash-lined field on FIG. 2. In view of performance difficulties found with convex faced rollers the flat faced spherical roller bearings are more commonly used.

In the traditional spherical roller bearings the function of the stabilizing ring is performed by the central shoulder on the inside ring. This shoulder has the shape of a dovetail, the flanks of which form truncated cones with concave or rectilinear generatrix. If this generatrix is concave and formed by the radius drawn from the intersection point of the spherical roller rotation axis on the main axis of the bearings, and if the spherical roller end faces are flat, then the spherical rollers have linear contact with the stabilizing ring when the bearing is at rest, as shown by the heavy line on FIG. 3.

On the other hand—in case of the rectilinear generatrix—there is a double-point contact as shown by points C—C in FIG. 4.

However, during the rotary motion of the bearing the linear contact shown in FIG. 3, and eventually the double-point one shown in FIG. 4 changes into a single-point contact, as shown in FIG. 5 at point C. This is a consequence of the difference in the peripheral speeds in the individual spherical rollers contact points on the inner ring raceway, which follows from FIG. 1, namely; due to inclined raceway position—the diameter $d$ in the individual inner ring sections is variable and near the ring center it has the value of $d_{max}$, whereas near the ring faces—$d_{min}$. Thus, in the contact points on $d_{max}$ the highest rotary speed $V_{max}$ and on $d_{min}$ $-V_{min}$ will occur. Hence it follows that there is no pure rolling motion of the spherical rollers on the inner ring raceways in the symmetric spherical roller bearings, and therefore slippage takes place near the stabilizing ring. If such a bearing is loaded with a radial force, then at the places of slippage the friction forces $T_1$ will appear, which on the moment arm $a$ will give friction couples $M_1$, as shown in FIG. 5, i.e. $M_1=T_1.a$. In consequence—the spherical roller is skewed in the limits of the retainer pocket clearances, i.e. its rotation axis will be twisted through the angle $\Delta\gamma$ as shown in FIG. 5.

It is evident that due to such a skewing the spherical roller adhesion surfaces on the inner ring raceway are diminished, causing an increase of the unit pressures and a premature pitting of raceways and rolling surfaces of the spherical rollers. The result of spherical rollers skewing is an increase of loads on the guiding surfaces in the retainer pockets, causing their premature abrasion. The greater the force $T_1$ the bigger will be the loads. As the retainer pockets are abraded the spherical roller clearance in those pockets increases, and thus also the skewing with all the above described consequences.

However the above skewing phenomena meet a counteraction of the friction forces at point C, where the spherical rollers contact the stabilizing ring. The resultant $T_2$ of those forces gives the moment $M_2=T_{2.6}$, where $M_2 \geq M_1$. It is shown in FIG. 5 that the spherical roller contact point C is positioned on the stabilizing ring edge. The point contact on this edge is the reason of the known phenomenon of the contact stress concentration, the detrimental effect of which is evident.

As a result of the spherical roller end face edge single contact with the stabilizing ring edge in case of the contact stress concentration, an accelerated abrasion of faces follows at the edges of this ring, and therefore a gradual loss of its stabilizing properties. In effect there is an increase of the friction couple in a bearing due to sticking of the skewed spherical rollers.

In consequence of the above phenomena that follows the above described premature pitting of the raceway and thus—a shortening of its life.

The present invention provides an optimal shape for the stabilizing ring contact surface with flat end face spherical rollers, which will prevent a premature wear of those surfaces and simultaneously will be easy to produce. Such advantages are achieved by any convex shape and especially by an arc described by the radius $r$ if the tangent in the central part of this convexity point D in FIG. 6 is inclined at the angle $\beta$, smaller than the angle $\alpha$ of the spherical rollers axis of rotation with the main axis of the bearing, as shown in FIG. 6; on this main axis the floating stabilizing ring 1 located between the inner and outer recess has flanks 3 described by the radius $r$ and the tangent B—B at the point D on the centre of convexity is inclined at an angle $\beta < \alpha$.

The optimal value for the angle $\beta$ and the radius $r$ has been fixed in such a way that in case of zero loading in a non-rotating bearing the double point contact with the stabilizing ring is in the centre of convexity and at half of the stabilizing ring section height points $C'$ in FIG. 7 or in direct vicinity of this centre.

Such a bearing with the floating stabilizing ring has a great elasticity in running. Beyond the radial load it is able to withstand considerable axial forces, whereby a uniform distribution of loads is assured on both rows of the spherical rollers, like in the bearing according to the Polish Pat. No. 36,636, however its performance according to the present invention is improved.

In a bearing loaded with axial force, as shown in FIG. 8, the spherical rollers displace themselves in the limits of radial clearance by the value $\Delta l$. At the same time these rollers displace the stabilizing ring by the value $\Delta/.\sec \alpha$, whereby the inclination angle of the spherical rollers rotation axis will increase by some value $\Delta \alpha$, i.e. the spherical rollers end face inclination will change by the same value $\Delta \alpha$. In that case the spherical roller contact points on the stabilizing ring in one of the spherical roller rows will displace themselves slightly by the value $\Delta m$ from the centre of the convex surface towards the bearing axis from point C to point C'. On the other hand in the other spherical rollers row the contact points will displace themselves by the same value in the opposite direction. The contact remains therefore on the convex surface, however on the other circumference, displaced by the value $\pm \Delta m$.

This is the essential advantage of the spherical roller bearing with the convex stabilizing ring, contacting the flat end face spherical rollers. In such a ring no edge stresses are present, as due to a suitably chosen value of angle $\beta$ the spherical roller pressures are intercepted in the central part of this ring rotation, and thus the wear of its flanks is considerably limited.

The bearing executed according to the described method has much longer life, or a higher load carrying capacity for the usual life. Such a bearing may be constructed both with symmetrical as well as with non-symmetrical spherical rollers.

A further feature of this invention is the solid retainer for the described bearing. The known solid retainers for double-row spherical roller bearings have unilateral centering and their pockets for rolling elements are open from one side. Beyond some essential advantages such retainers have also several defects when compared with retainers pressed from metal sheet. Their main defects are:

(1) Insufficient stability of the retainer due to unilateral centering;

(2) Insufficient rigidity of ribs between spherical roller pockets; these ribs, being joined with the retainer body at one side only, are subjected to bending when the bearing is running and therefore crack at their base;

(3) Single-point centering of the spherical rollers in the retainer's pockets, and in the best case—a linear centering, limited to one half the length of the spherical rollers;

(4) An open structure of the retainer needs much more complicated and thus—more expensive construction of the bearing with flanges on the outer ring end faces for protecting the spherical rollers against falling out at the deflected position of the inner ring;

(5) A lack of protection against pollution of the bearing, as all the spherical rollers are fully open at its outside part.

All the above defects of the discussed retainers are entirely or partially eliminated by the construction according to the present invention.

The longitudinal half-section of the double-row spherical roller bearing with the retainer according to the invention is shown in FIG. 9. This retainer comprises the body 4 and the reinforcing ring 5. The retainer body is guided on the stabilizing ring 1 or—when the retainer is utilized in a traditional design bearing—on the inner ring centre shoulder 6. The reinforcing ring 5 is guided on the extension 7 of the inner ring raceway. The retainer body and the reinforcing ring are combined one with the other in a durable way by means of standardized joining elements 8, such as: pins, notched pins, rivet pins, screws etc., whereby those elements are positioned in such a way that the prolongations of their axes converge at one point, situated on the longitudinal axis of the bearing. Such positioning of the joining elements assures a durable unification of both parts of the retainer. This unification may be carried out also by means of such metal joining media as epoxy-cements and similar ones. The spherical roller guiding pocket shape in these retainers is fully or partially adapted to the shape of the spherical rollers. Those pockets are made both in the body 4 and in the reinforcing ring 5, whereby the pockets in the ring 5 constitute a prolongation of the pockets in the body 4, as shown in FIG. 10.

By means of such a structure a good two-sided centering of the retainer on the inner race as well as a two-point centering of the spherical rollers in the retainers in points $m$ and $n$ is assured.

The longitudinal section of the retainer according to this invention is shown in FIG. 11.

The body 4 viewed from the pockets' side is shown in FIG. 12.

The reinforcing ring 5 viewed also from the pockets' side is shown in FIG. 13. In FIG. 14 there is shown a bearing having two rows of spherical roller bearings and retainers having bodies 4 provided at their interiors with circumferentially and inwardly extending guiding collars 9 which rest on a narrow cylindrical strip 10 formed on the inner race or raceway 7 between the two rows.

In some cases the stabilizing ring is negligible in the spherical roller bearings, viz, when a big spherical roller is used in lighter running conditions and is loaded only with the static force. For such a solution however a different design of the retainer is needed.

FIG. 15 shows a longitudinal half-section of the double-row spherical roller bearing with a further modification of the solid retainer. This retainer is common for both rows of the spherical rollers and consists of three parts: one body 11 and two reinforcing rings 5, which are guided on the inner raceway extension. The reinforcing rings 5 are combined with the body 11 in the same way as in the two previous embodiments.

FIG. 16 shows in plan one fragment of this retainer. Such a retainer is intended for running in a bearing without a stabilizing ring, in which only the radial forces are present. Its construction provides an increase in the load carrying capacity of the bearing by about 7%.

Tests show that in heavy duty conditions, in which large dynamic forces are present, the double row spherical roller bearings with solid retainers, made according to this invention, had several times the life of conventional structures.

What is claimed is:

1. A bearing having inner and outer races and two rows of spherical roller bearings between them, said bearing having a floating stabilizing ring between the bearing rows and between said races, said floating stabilizing ring having convex flanks of such curvature that a tangent to a said flank at the central part thereof is at an angle to a plane transverse to the bearing longitudinal axis which is less than the angle between the main bearing axis and the axis of rotation of a said spherical roller bearing, said spherical roller bearings having flat end faces in juxtaposition with said stabilizing ring.

2. The bearing of claim 1, said stabilizing ring being adjacent the bearing inner race.

3. The bearing of claim 2, and retainer means for a row of said roller bearings comprising a circumferentially extending body between said races and guided on said stabilizing ring, and a reinforcing ring secured to said body and engaging said inner race, said retainer means comprising circumferentially spaced pockets for said roller bearings.

References Cited

UNITED STATES PATENTS

| | | | |
|---|---|---|---|
| 1,202,576 | 10/1916 | Perkins | 308—217 |
| 1,967,650 | 7/1934 | Ahmansson | 308—214 |
| 2,008,336 | 7/1935 | Palmgren | 308—214 |

FOREIGN PATENTS

| | | | |
|---|---|---|---|
| 341,734 | 1/1931 | Great Britain | 308—217 |
| 659,692 | 10/1951 | Great Britain | 308—213 |

FRED C. MATTERN, JR., Primary Examiner

F. SUSKO, Assistant Examiner